United States Patent
Hsieh

(10) Patent No.: US 7,006,136 B1
(45) Date of Patent: Feb. 28, 2006

(54) METHOD OF DEFECTIVE PIXEL ADDRESS DETECTION FOR IMAGE SENSORS

(75) Inventor: Ming-Tsun Hsieh, Mountain View, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 840 days.

(21) Appl. No.: 09/671,567

(22) Filed: Sep. 27, 2000

Related U.S. Application Data

(60) Provisional application No. 60/217,824, filed on Jul. 12, 2000.

(51) Int. Cl.
*H04N 9/64* (2006.01)
*H01L 27/00* (2006.01)
*G06K 9/40* (2006.01)
*G06F 12/00* (2006.01)

(52) U.S. Cl. .................. 348/247; 250/208.1; 382/275; 711/218

(58) Field of Classification Search ............... 348/243, 348/245, 246, 247; 250/208.1; 382/275; 358/529, 518; 711/108, 110, 200, 202, 207, 711/213, 218, 221
See application file for complete search history.

(56) References Cited

U.S. PATENT DOCUMENTS

| | | | | |
|---|---|---|---|---|
| 4,739,495 A | * | 4/1988 | Levine | 348/247 |
| 4,805,023 A | * | 2/1989 | Younse et al. | 348/247 |
| 4,893,185 A | * | 1/1990 | Fukushima et al. | 348/247 |
| 5,113,246 A | * | 5/1992 | Ninomiya et al. | 348/247 |
| 5,436,659 A | * | 7/1995 | Vincent | 348/246 |
| 5,499,114 A | * | 3/1996 | Compton | 348/246 |
| 6,070,233 A | * | 5/2000 | Whittaker | 711/144 |
| 6,134,143 A | * | 10/2000 | Norman | 365/185.09 |
| 6,396,539 B1 | * | 5/2002 | Heller et al. | 348/246 |
| 6,404,694 B1 | * | 6/2002 | Ayukawa et al. | 365/230.03 |
| 6,509,927 B1 | * | 1/2003 | Prater et al. | 348/246 |
| 6,642,961 B1 | * | 11/2003 | Hsieh | 348/247 |
| 6,665,009 B1 | * | 12/2003 | Dong | 348/246 |
| 2001/0038416 A1 | * | 11/2001 | Koren et al. | 348/294 |
| 2004/0080636 A1 | * | 4/2004 | Dong | 348/247 |

FOREIGN PATENT DOCUMENTS

JP 60084646 A * 5/1985

* cited by examiner

*Primary Examiner*—Ngoc-Yen Vu
*Assistant Examiner*—John M. Villecco
(74) *Attorney, Agent, or Firm*—J.C. Patents

(57) ABSTRACT

A method of defective pixel address detection for image sensor. During the image sensor is tested, a number of defective pixel addresses of the image sensor are stored into a memory element and indexed. Each of the pixels of the image sensor is read in sequence and then compared with the indexed defective pixel address. If the sensor address is equal to the indexed defective pixel address, a defective pixel flag is outputted and then the index is increased by one. If the sensor address is not equal to the defective pixel address, the defective pixel address is compared with an empty signature. After the index is increased or the defective pixel address is not an empty signature, the detection process is continued.

9 Claims, 2 Drawing Sheets

Defective pixel address
(Row addr + Col. addr)

| index → | 0 | 0000_0000_0000_0000_0100 |
|---|---|---|
| | 1 | 0000_0000_0000_0000_0101 |
| | 2 | 0000_0000_0000_0000_0110 |
| | ⋮ | |
| | 126 | 1111_1111_1111_1111_1111 |
| | 127 | 1111_1111_1111_1111_1111 |

METHOD OF DEFECTIVE PIXEL ADDRESS DETECTION FOR IMAGE SENSORS

CROSS-REFERENCE TO RELATED APPLICATION

This application claims the priority benefit of U.S. Provisional Application Ser. No. 60/217,824, filed Jul. 12, 2000, the full disclosure of which is incorporated herein by reference.

BACKGROUND OF THE INVENTION

1. Field of Invention

The present invention relates to a method of pixel address detection of an image sensor. More particularly, the present invention relates to a method of defective pixel address detection of an image sensor.

2. Description of Related Art

As the multimedia era is coming, digital information, such as digital images or digital movies, becomes more popular. Modern technology has highly developed, and the cost of image sensors for generating digital images or pictures reduces. More people can access these high technological products. However, there are still some problems about the image sensors.

Due to the current process, it is hard to fabricate an image sensor perfectly without any bad or defective pixel thereon. Therefore, there are always some defective pixels on the image sensor after it is fabricated. The image or picture sensed by the defective pixels will affect the quality of the image or picture. And the following imaging procedure, such as color processing or image compressing etc, will also affected. How to reduce the effect of the defective pixels of the image sensor becomes a significant topic.

SUMMARY OF THE INVENTION

The invention provides a method of defective pixel address detection for an image sensor. The method comprises: (a) comparing a defective pixel address with a sensor address, wherein the defective pixel address is stored in a memory element in advance when the image sensor is tested; (b) outputting a defective pixel flag if the sensor address is equal to the defective pixel address; (c) increasing an index value by one unit and returning to the step (a); (d) comparing the defective pixel address with an empty signature if the sensor address is not equal to the defective pixel address; (e) increasing the index value by one unit if the defective pixel address is equal to the empty signature, and returning to the step (a); and (f) returning to the step (a) if the defective pixel address is not equal to the empty signature.

The invention provides a method of defective pixel address detection for an image sensor. The method comprises the steps of: storing a plurality of defective pixel addresses during the image sensor is tested. A pixel address of the image sensor is read and then one of the defective pixel addresses is fetched. The first fetched defective pixel address is compared with the pixel address of the sensor address. If the pixel address is equal to the defective pixel address a defective pixel flag for indicating the current pixel is bad is outputted, and then an index value is increased by one unit. Another defective pixel address which is indexed next to the first fetched defective pixel address is further fetched. The defective pixel address is further compared with an empty signature if the pixel address is not equal to the defective pixel address. The index value is then increased by one unit if the defective pixel address is the empty signature, and another defective pixel address which is indexed next to the first fetched defective pixel address. Another defective pixel address which is indexed next to the first fetched defective pixel address is further fetched if the defective pixel address is not the empty signature.

Advantageously, the present invention provides an effective and efficient method for determining whether the pixel of the image sensor is defective, by which the following color processing and image compression etc can be significantly simplified. In addition, the method of defective pixel address detection for image sensor is in a simple and low cost way.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 schematically shows a block diagram for carrying out the method of the present invention according to one preferred embodiment of this invention.

DESCRIPTION OF THE PREFERRED EMBODIMENTS

Figure 1:
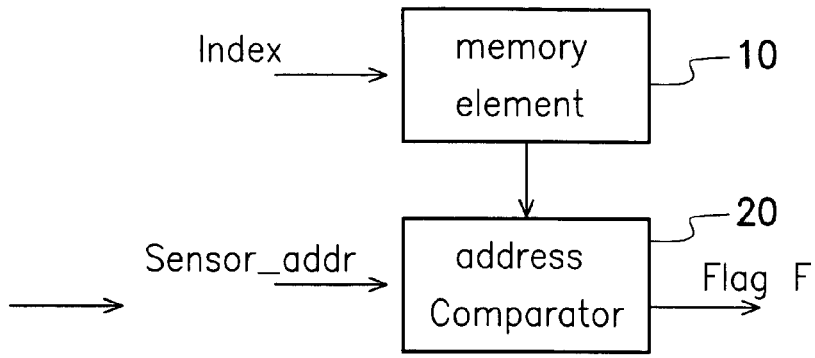

FIG. 1 schematically shows a block diagram for carrying out the method of the present invention. The circuit of defective pixel address detection for an image sensor comprises at least a memory element 10 and an address comparator 20. The memory element 10 is used for storing the defective pixel addresses which are detected during the image sensor is tested. The memory element 10 can be a fuse array, for example. The address comparator 20 receives a current sensor address of the image sensor Sensor_addr and fetches a defective pixel address Def_pixel_addr from the memory element 10. The address comparator 20 then compares the two addresses, Sensor_addr and Def_pixel_addr. If the two addresses Sensor_addr and Def_pixel_addr are the same, which means a hit, the address comparator 20 generates a flag bit F to indicate that the current sensor address of the image sensor is a defective pixel. The index of the memory element 10 is increased by one unit, such as 1, to begin another cycle of address comparison. If the two addresses Sensor_addr and Def_pixel_addr are not the same, which means a miss, the address comparator 20 sets the flag bit F to a value, such as 0, to indicate that the current sensor address of the image sensor is a good pixel. And then another cycle of address comparison is begun.

Figure 2:
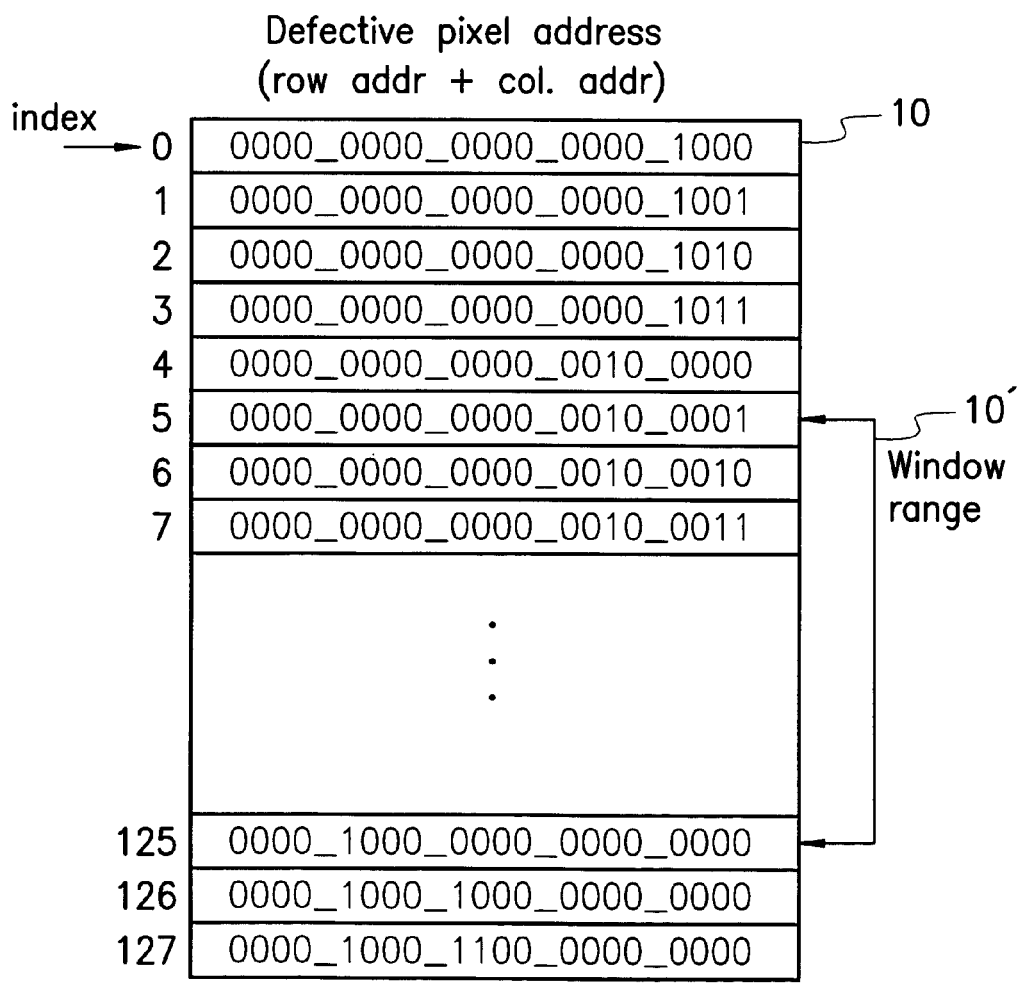
FIG. 2 illustrates a schematic diagram of the format of the storage unit for fully storing the defective pixel addresses according to one preferred embodiment of this invention.

FIG. 2 illustrates a schematic diagram of the format of the storage unit for storing the defective pixel addresses. As shown in FIG. 2, for example, the memory element 10 contains 128 addresses, which are indexed from 0 to 127. Each indexed address may consist of a row address and a column address of every defective pixel address, for example. In this embodiment, the defective pixel address of index 0 is 0000_0000_0000_0000_0100. For convenience, the defective pixel addresses stored in the memory element 10 is in an ascending order, but not limited in the present invention. In the example shown in FIG. 2, the memory element 10 is full of the defective pixel addresses. When the index is pointed to the last one, the index 127, of the memory element 10 and there is a hit, the index is wrapped around to the first one, the index 0, of the memory element 10.

Figures 3, 4:
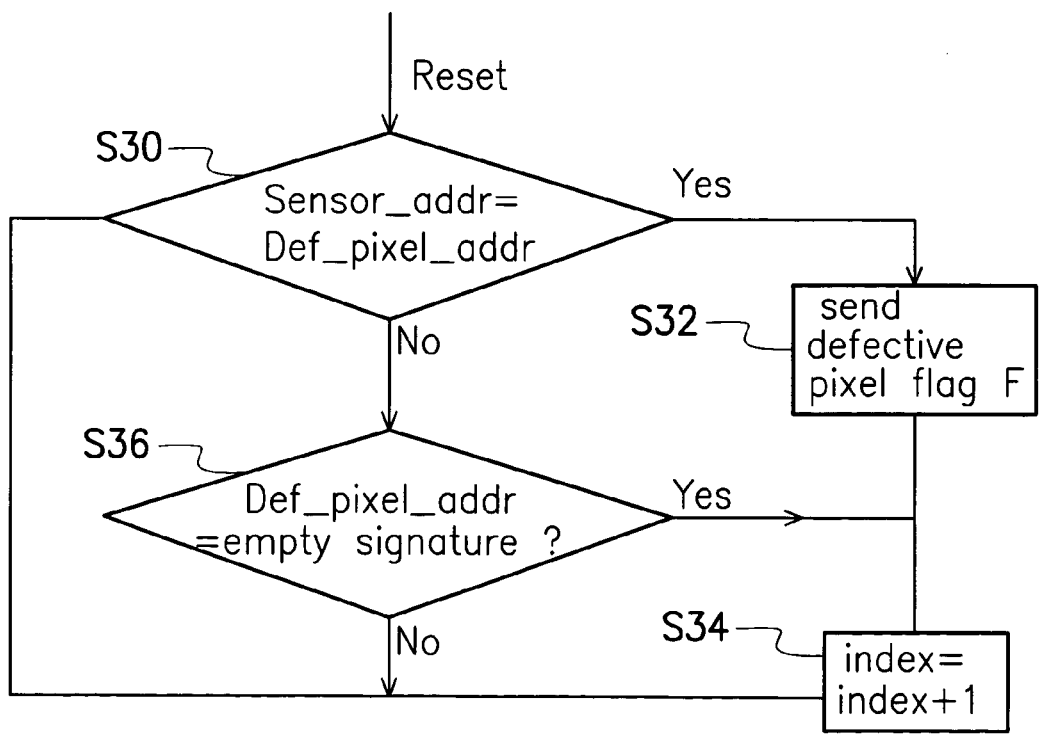
FIG. 3 illustrates a schematic diagram of the format of the storage unit for storing the defective pixel addresses with empty signatures according to one preferred embodiment of this invention.
FIG. 4 schematically shows a flow chart of the method of defective pixel address detection for image sensor.

FIG. 3 illustrates a schematic diagram of the format of the memory element 10 for storing the defective pixel addresses. As shown in FIG. 3, for example, the memory element 10 contains 128 addresses, which are indexed from 0 to 127. Each indexed address consists of a row address and a column address of every defective pixel address, for example. For convenience, the defective pixel addresses stored in the memory element 10 is in an ascending order, but not limited in the present invention. However, in the example shown in FIG. 3, the total number of the defective pixels is less than that of the memory element 10, each of the remained spaces of the memory element 10 is stored with an empty signature for indicating that no more defective pixel address is stored. The empty signature, for example, has a format of 1111_1111_1111_1111_1111. The index 126 and index 127 are examples for empty signature. When the empty signature is read, the index is forced to be increased by one. Similarly, when the index is pointed to the last one, the index 127, of the memory element 10 and there is a hit, the index is wrapped around to the first one, the index 0, of the memory element 10.

The method of defective pixel address detection for image sensor is described in detail according to FIG. 4. FIG. 4 schematically shows a flow chart of the method of defective pixel address detection for an image sensor.

The feature of the algorithm of the present invention is that the addresses of the defective pixels are put in the memory element (item 10 as shown in FIG. 1) in a specific order, such as an ascending order. Therefore, if there is a hit, the index can be simply increased by one unit, such as 1, and then another address comparison cycle is begun.

Referring to FIGS. 4 and 1, according to the embodiment of the present invention, after an image sensor is fabricated, the image sensor is tested for finding defective pixels on the image sensor. The detected defective pixel addresses are then stored into the memory element 10 in an ascending order. The memory element 10 further comprises an index for indicating the current fetched defective pixel address, which as shown in FIG. 2 or FIG. 3.

As the image sensor operates, a reset step is performed, by which the index of the memory element 10 indicates the first location that will be fetched first as following, and the image sensor is set to the first pixel waiting for sensing.

When the sensing process begins, the pixel addresses of the image sensor are read in sequence. After one pixel address of the image sensor is read by the address comparator 20, the address comparator 20 further fetches a defective pixel address indicated by the index 0 from the memory element 10.

As shown in FIG. 4, the step S30 is then performed. The address comparator 20 receives the pixel address of the image sensor Sensor_addr and the defective pixel address Def_pixel_addr, and compares the two addresses. If the address Sensor_addr hits the address Def_pixel_addr, which means the same, the step S32 is performed. Namely, the address comparator 20 outputs a defective pixel flag F for indicating the current pixel of the image sensor is a defective or bad pixel.

After the defective pixel flag F is outputted, the step S34 is performed to increase the index of the memory element 10 by one, for example index 1 as shown in FIG. 2 or 3. After the index is increased by one, another address comparison cycle begins. Namely, the address comparator 20 read another pixel address of the image sensor and next defective pixel address indicated by index 1.

In the S30 of the address comparison, If the address Sensor_addr misses the address Def_pixel_addr, which means not the same, the step S36 is peformed. Namely, the address comparator 20 sets the defective pixel flag F to a specific value, such as 0, for indicating the current pixel of the image sensor is a good pixel.

At the step S36, when address Sensor_addr and address Def_pixel_addr are not the same, whether the address Def_pixel_addr is an empty signature is determined. The empty signature, for example, has a format of 1111_1111_1111_1111_1111. The index 126 and index 127 are examples for empty signature. When the empty signature is detected, the index is forced to be increased by one. Namely, the empty signature of the defective pixel address is detected, the step S34 is performed to increase the index by one. After the index is increased by one, another address comparison cycle begins. Namely, the step S30 is performed and the address comparator 20 read another pixel address of the image sensor and next defective pixel address indicated by index 1.

Furthermore, at the step S36, if the defective pixel address is not an empty signature, the procedure returns to the step S30. The address comparator 20 read another pixel address of the image sensor and next defective pixel address indicated by index 1.

Accordingly, the present invention provides an effective and efficient method for determining whether the pixel of the image sensor is defective during operation of the image sensor. The following color processing and image compression etc can be significantly simplified. In addition, the method of defective pixel address detection for image sensor is in a simple and low cost way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of defective pixel address detection for an image sensor, comprising:
    (a) comparing a defective pixel address with a sensor address, wherein the defective pixel address is stored in a memory element in advance when the image sensor is tested;
    (b) outputting a defective pixel flag if the sensor address is equal to the defective pixel address;
    (c) increasing an index value by one unit and returning to the step (a);
    (d) comparing the defective pixel address with an empty signature if the sensor address is not equal to the defective pixel address;

(e) increasing the index value by one unit if the defective pixel address is equal to the empty signature, and returning to the step (a); and (f) returning to the step (a) if the defective pixel address is not equal to the empty signature.

2. The method of claim 1, wherein the defective pixel address stored in the memory element is in an ascending order.

3. The method of claim 1, wherein the memory element is a fuse array.

4. The method of claim 1, wherein the defective pixel address stored in the memory element is in a format consisting of a row address and a column address of the image sensor.

5. A method of defective pixel address detection for an image sensor, comprising the steps of:

storing a plurality of defective pixel addresses during the image sensor is tested;

reading a pixel address of the image sensor;

fetching one of the defective pixel addresses;

comparing the first fetched defective pixel address with the pixel address of the sensor address;

outputting a defective pixel flag if the pixel address is equal to the defective pixel address;

increasing an index value by one unit and fetching another defective pixel address which is indexed next to the first fetched defective pixel address;

comparing the defective pixel address with an empty signature if the pixel address is not equal to the defective pixel address;

increasing the index value by one unit if the defective pixel address is the empty signature, and then fetching another defective pixel address which is indexed next to the first fetched defective pixel address; and fetching another defective pixel address which is indexed next to the first fetched defective pixel address if the defective pixel address is not the empty signature.

6. The method of claim 5, wherein the plurality of the defective pixel addresses are stored in a memory element.

7. The method of claim 6, wherein the defective pixel addresses stored in the memory element is in as ascending order.

8. The method of claim 6, wherein the defective pixel address stored in the memory element is in a format consisting of a row address and a column address of the image sensor.

9. The method of claim 6, wherein the memory element is a fuse array.

* * * * *